(12) United States Patent
Singh et al.

(10) Patent No.: US 11,891,961 B1
(45) Date of Patent: Feb. 6, 2024

(54) GASEOUS FUEL ENGINE SYSTEM AND OPERATING STRATEGY FOR LIMITING CRANKCASE FUEL ACCUMULATION

(71) Applicant: Caterpillar Inc., Peoria, IL (US)

(72) Inventors: Jaswinder Singh, Dunlap, IL (US); Eric Lee Schroeder, Germantown Hills, IL (US); Adam Joseph Clute, Lafayette, IN (US); Aaron Scott Ness, Battle Ground, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/879,978

(22) Filed: Aug. 3, 2022

(51) Int. Cl.
*F02D 19/02* (2006.01)
*F02D 41/30* (2006.01)

(52) U.S. Cl.
CPC ........... *F02D 19/021* (2013.01); *F02D 41/30* (2013.01)

(58) Field of Classification Search
CPC .............................. F02D 19/021; F02D 41/30
See application file for complete search history.

(56) References Cited

U.S. PATENT DOCUMENTS

| | | | |
|---|---|---|---|
| 2,524,597 A * | 10/1950 | Kline | F01M 13/028 123/41.86 |
| 3,154,059 A | 10/1964 | Witzky et al. | |
| 3,577,726 A * | 5/1971 | Wagner | F02B 43/00 60/599 |
| 4,066,046 A | 1/1978 | McAlister | |
| 5,937,837 A | 8/1999 | Shaffer et al. | |
| 8,191,537 B1 * | 6/2012 | Moy | F02M 25/06 123/573 |
| 8,800,530 B2 | 8/2014 | Vijayaraghavan et al. | |
| 9,528,406 B2 | 12/2016 | Glugla et al. | |
| 9,695,755 B2 | 7/2017 | Glugla et al. | |
| 9,856,835 B1 * | 1/2018 | Coldren | F02M 21/0284 |
| 9,920,684 B2 | 3/2018 | Schouweiler, Jr. | |
| 10,832,497 B2 * | 11/2020 | Doyle | G01D 5/30 |
| 11,261,766 B1 * | 3/2022 | Dudar | F02D 41/22 |
| 2010/0012103 A1 * | 1/2010 | Lewis | F02M 25/06 123/574 |
| 2010/0031904 A1 * | 2/2010 | Matsuura | F01M 13/023 123/574 |
| 2011/0072814 A1 * | 3/2011 | Tice | F02M 35/024 60/605.2 |
| 2014/0116399 A1 * | 5/2014 | Ulrey | F02B 37/164 123/520 |
| 2015/0204263 A1 * | 7/2015 | DeAngelis | F02D 41/30 123/478 |
| 2016/0169143 A1 * | 6/2016 | Monros | F01M 13/04 123/525 |

\* cited by examiner

*Primary Examiner* — Carl C Staubach
(74) *Attorney, Agent, or Firm* — Brannon Sowers & Cracraft PC

(57) ABSTRACT

Operating a gaseous fuel engine system includes controlling at least one of a delivery location, a delivery timing, or in situ mixing of a gaseous fuel with air, based on at least one engine system parameter upon the basis of which a blowby amount of a gaseous fuel to a crankcase varies. Crankcase accumulation of the gaseous fuel is maintained below a flammability limit. Related apparatus and control logic is also disclosed.

20 Claims, 2 Drawing Sheets

GASEOUS FUEL ENGINE SYSTEM AND OPERATING STRATEGY FOR LIMITING CRANKCASE FUEL ACCUMULATION

STATEMENT OF GOVERNMENT INTEREST

This invention was made with government support under Contract No. DE0009422 awarded by the Department of Energy. The government has certain rights in this invention.

TECHNICAL FIELD

The present disclosure relates generally to operating a gaseous fuel engine system, and more particularly to maintaining crankcase accumulation of gaseous fuel below a flammability limit.

BACKGROUND

Gaseous fuel engines are used globally for diverse purposes ranging from vehicle propulsion to operation of pumps and compressors, to electrical power generation and a variety of other applications. Gaseous fuels, conventionally gaseous hydrocarbon fuels such as natural gas, tend to produce fewer emissions of at least certain types and are generally widely available. In a typical configuration a gaseous fuel such as natural gas is conveyed into a combustion cylinder in an engine and spark-ignited to produce a controlled combustion reaction driving a piston in the engine to rotate a crankshaft. A great many different engine arrangements and operating strategies have been proposed over the decades.

In recent years increased engineering efforts have been directed at the use of alternative fuels, including gaseous hydrogen fuels. Combustion of hydrogen with air produces few emissions and notably substantially zero so-called greenhouse gas or GHG emissions. Exploiting hydrogen as a fuel in reciprocating engines provides a great many new challenges, however. Hydrogen tends to be less energy dense than certain traditional fuels, has a faster flame speed, and requires special storage and handling techniques and apparatus in certain instances.

In many engines, a phenomenon known as "blowby" can occur, where fluids from a combustion chamber are urged past a piston during operation. In liquid-fuel engines, fuel and oil that blows by a piston can sometimes be collected and reused or disposed of. In gaseous fuel engines, blowby may be more difficult to manage. One known technology addressing blowby is set forth in U.S. Pat. No. 5,937,837 to Shaffer et al.

SUMMARY

In one aspect, a method of operating a gaseous fuel engine system includes monitoring at least one engine system parameter upon the basis of which a blowby amount of a gaseous fuel to a crankcase in a gaseous fuel engine varies, and conveying the gaseous fuel into a cylinder in the gaseous fuel engine for combustion. The method further includes controlling at least one of a delivery location, a delivery timing, or in situ mixing of a gaseous fuel with air, based on the monitored at least one engine system parameter. The method still further includes maintaining crankcase accumulation of the gaseous fuel below a flammability limit based on the controlling at least one of a delivery location, a delivery timing, or in situ mixing of the gaseous fuel with air.

In another aspect, a gaseous fuel engine system includes a gaseous fuel engine having a cylinder formed therein, and a crankcase in blowby communication with the cylinder. The engine system further includes a fuel system having a first gaseous fuel admission valve at a first fuel delivery location relative to the cylinder and a second gaseous fuel admission valve at a second fuel delivery location relative to the cylinder. The engine system further includes a fueling control unit in control communication with each of the first gaseous fuel admission valve and the second gaseous fuel admission valve. The fueling control unit is structured to monitor at least one engine system parameter upon the basis of which a blowby amount of a gaseous fuel from the cylinder to the crankcase varies, and to vary at least one of a fuel delivery split between the first fuel delivery location and the second fuel delivery location, a fuel delivery timing, or in situ mixing of the gaseous fuel with air in the cylinder, based on the monitored at least one engine system parameter, to maintain crankcase accumulation of the gaseous fuel below a flammability limit.

In still another aspect, a fuel system for a gaseous fuel engine system includes a fueling control unit structured to monitor at least one engine system parameter upon the basis of which a blowby amount of a gaseous fuel from a cylinder to a crankcase in a gaseous fuel engine varies, and to control, via fueling control commands, to at least one of a first fuel admission valve at a first fuel delivery location relative to the cylinder and a second fuel admission valve at a second fuel delivery location relative to the cylinder, at least one of a delivery location or a delivery timing of gaseous fuel to the cylinder, based on the monitored at least one engine system parameter. The fueling control unit is further structured to limit crankcase accumulation of the gaseous fuel based on the controlling at least one of a delivery location or a delivery timing of the gaseous fuel.

DETAILED DESCRIPTION

Figure 1:
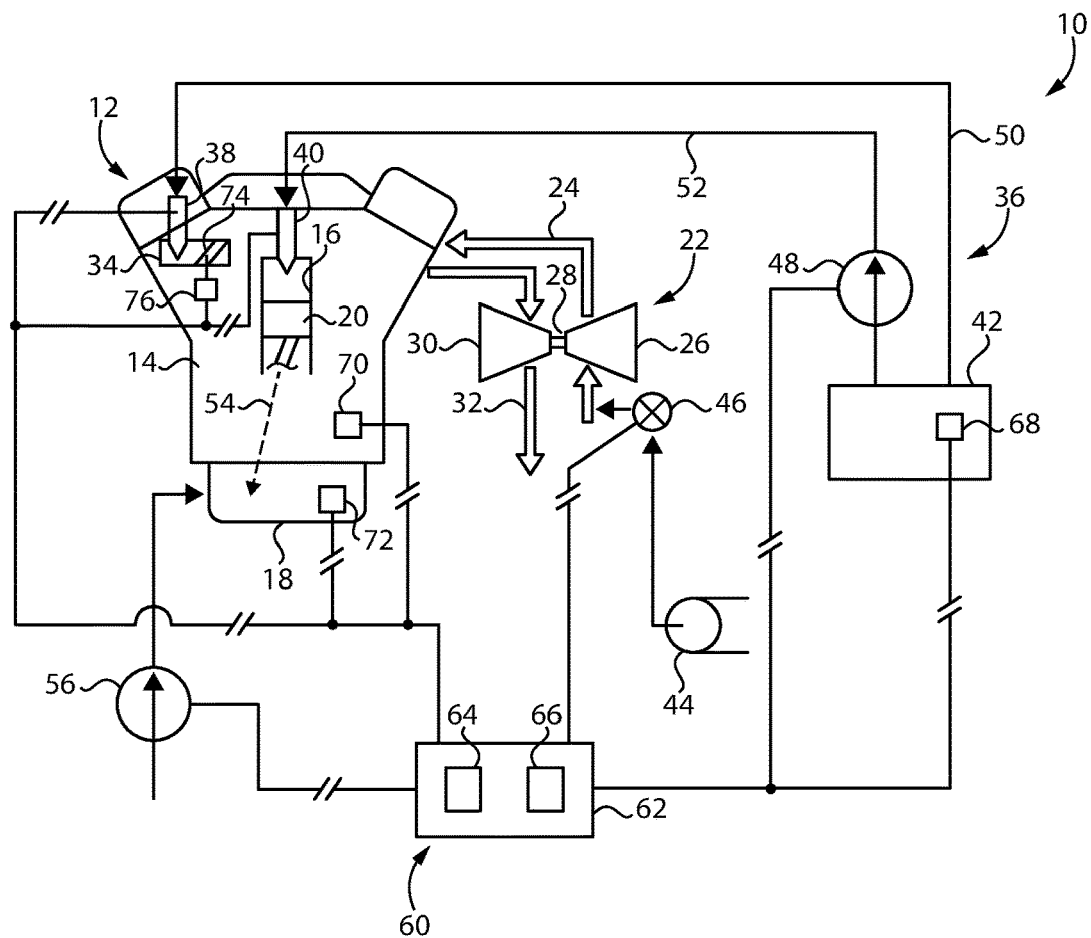
FIG. 1 is a diagrammatic view of a gaseous fuel engine system, according to one embodiment.

Referring to FIG. 1, there is shown a gaseous fuel engine system 10, according to one embodiment. Engine system 10 includes a gaseous fuel engine 12 having an engine housing 14 with a cylinder 16 formed therein. A piston 20 is shown movable within cylinder 16 in a generally conventional manner between a top-dead-center position and a bottom-dead-center position, typically in a four-stroke cycle. Cylinder 16 may be one of a plurality of cylinders formed in engine housing 14 of any number and in any suitable arrangement such as an in-line pattern, a V-pattern, or still another. Engine system 10 also includes an intake system 22 having an intake conduit 24 structured to receive air to be conveyed to gaseous fuel engine 12. A compressor 26 of a turbocharger 28 is within intake conduit 24 and operable to pressurize intake air in a generally conventional manner. Turbocharger 28 also includes a turbine 30 positioned in an exhaust conduit 32 and rotated via a flow of exhaust from gaseous fuel engine 12.

Gaseous fuel engine 12 also includes a crankcase 18 in blowby communication with cylinder 16. Those skilled in the art will be familiar with the phenomenon of blowby where fluids in a cylinder blow past a piston or piston rings and escape the combustion chamber of the cylinder, typically during a compression stroke or a power stroke of the piston. In FIG. 1, arrow 54 indicates an approximate blowby communication path from cylinder 16 to crankcase 18. In some instances, unburned gaseous fuel may form some of a mixture of gases that blow by into an engine crankcase. Accumulation of gaseous fuel in an engine crankcase can present challenges relative to the possibility of ignition within the crankcase leading to catastrophic engine failure, as well as the possibility for leaks of flammable gaseous fuel. In the case of engines operating on a gaseous hydrogen fuel (H2), such as gaseous molecular hydrogen or blends of H2 and a gaseous hydrocarbon fuel (HC), the desire to mitigate gaseous fuel accumulation in a crankcase can be significant given the flammability limits of gaseous hydrogen fuels. A so-called lower flammability limit is generally understood as the lowest concentration of a fuel that can ignite with air at a given temperature and pressure. Techniques are known for purging a crankcase of accumulated combustible gases, including pumping air into and through an engine crankcase to dilute the mixture therein. According to the present disclosure, active controls affecting the combustion process and various other operating parameters are employed to limit crankcase accumulation of gaseous fuel typically maintaining crankcase accumulation of gaseous fuel below a flammability limit.

Engine housing 14 further includes an intake port 34 structured to convey pressurized air from intake conduit 52 and, at least at times, gaseous fuel to cylinder 16 for combustion. Intake port 34 may be one of a plurality of intake ports for a plurality of cylinders. Analogously, other apparatus referred to in the singular in connection with cylinder 16 will be understood to refer to any of a plurality of like apparatus in engine system 10. A single cylinder engine is nevertheless within the scope of the present disclosure. Engine system 10 also includes a fuel system 36 having a first gaseous fuel admission valve 38 at a first fuel delivery location relative to cylinder 16. In the illustrated embodiment the first fuel delivery location is a port injection fuel delivery location and first gaseous fuel admission valve 38 is understood as a port injection fuel admission valve. Fuel system 36 also includes a second gaseous fuel admission valve 40 at a second fuel delivery location relative to cylinder 16. In the illustrated embodiment the second fuel delivery location is a direct injection fuel delivery location and second gaseous fuel admission valve 40 is understood as a direct injection fuel admission valve. As will be further apparent from the following description, fuel system 36 can be operated to vary at least one of a fuel delivery location including a fuel delivery split between a first fuel delivery location and a second fuel delivery location, vary a fuel delivery timing, or vary in situ mixing of gaseous fuel with air in cylinder 16, based upon at least one engine system parameter upon the basis of which a blowby amount of a gaseous fuel from cylinder 16 to crankcase 18 varies. Varying the at least one of a fuel delivery location, a fuel delivery timing, or in situ mixing of gaseous fuel with air in cylinder 16 can maintain crankcase accumulation of the gaseous fuel below a flammability limit. In addition, crankcase 18 may be ventilated at times as further discussed herein.

Fuel system 36 also includes a gaseous hydrogen fuel supply or H2 supply 42. H2 supply 42 may store a gaseous hydrogen fuel (H2) including gaseous molecular hydrogen or blends of H2 and another gaseous fuel in a pressurized state. A low-pressure fuel supply conduit 50 extends from H2 supply 42 to first gaseous fuel admission valve 38. In the illustrated embodiment the low-pressure H2 supplied to first gaseous fuel admission valve 38 may be supplied at a tank pressure. Thus, "low-pressure" and like terms are used herein in a relative sense. Fuel system 36 may also include a pressurization pump 48 connected to a high-pressure fuel delivery conduit 52 extending to second gaseous fuel admission valve 40. Pump 48, or potentially a plurality of pumps, can increase a pressure of H2 from a tank pressure to an increased pressure for direct injection into cylinder 16.

Fuel system 36 also includes a line gas supply 44 and a third fuel admission valve 46 that fluidly connects line gas supply 44 to intake conduit 24 at a location upstream of compressor 26. Line gas supply 44 can provide a gaseous predominantly hydrocarbon fuel, such as natural gas, mine gas, methane, ethane, landfill gas, biogas, various blends of these, or still another. In an embodiment line gas supply 44 supplies a mixture of H2 and HC that is premixed. Third gaseous fuel admission valve 46 can be opened, closed, or otherwise adjusted in position to vary a relative amount of gaseous fuel from line gas supply 44 that is supplied into intake system 22. In the illustrated embodiment gaseous fuel from line gas supply 44 is supplied by fumigation at a fumigation delivery location. It should be appreciated that the present disclosure contemplates a great variety of different ways whereby gaseous fuels, potentially of different types or different blend ratios, are provided to gaseous fuel engine 12. For instance, gaseous fuel from line gas supply 44 could be further pressurized and injected into an intake manifold of engine system 10. In other instances, fumigation could be combined with port injection only and no direct injector used. In still other variations fumigation and direct injection could be used to provide all of the fuel to gaseous fuel engine 12.

It will also be recalled that in addition to varying at least one of a fuel delivery location or a fuel delivery timing, in situ mixing of gaseous fuel with air in cylinder 16 can be varied to maintain crankcase accumulation of gaseous fuel below a flammability limit. In situ mixing means mixing within an engine, such as within an intake port or within the cylinder itself. In the illustrated embodiment, a swirl controller 74 in the nature of a movable valve, plate, vane, baffle, or other suitable structure coupled with an electrical actuator 76, is provided in or in proximity to intake port 34. By adjusting a position of swirl controller 74 a relative swirl ratio in gaseous fuel engine 12 can be varied, in turn increasing or decreasing mixing. In one example, adjusting a position of swirl controller 74 varies relative amounts of intake air or intake air and gaseous fuel that are provided to two intake valves for cylinder 16, thus adjusting swirl ratio.

It has been discovered that blowby amount of gaseous fuel can vary dependent upon a distribution of gaseous fuel in a cylinder. Where gaseous fuel is relatively more concentrated, such as in a center of a cylinder based on direct injection, then the relative amount of gaseous fuel in blowby gases to a crankcase can be less. Where gaseous fuel and air are better mixed in a cylinder, gaseous fuel may comprise a greater proportion of the gases that blow by a piston into a crankcase. The present disclosure leverages this recognition to, at times, concentrate the gaseous fuel more in certain locations in the cylinder to limit dispersion prior to combustion and thereby reduce the relative amount of gaseous fuel that ultimately makes its way into the crankcase. At other times, blowby may be less severe overall, and it is practicable to deliver gaseous fuel at locations other than direct injection locations, permitting and typically encouraging greater mixing. Moreover, reducing a relative amount of direct injected gaseous fuel can improve efficiency given lower pressurization requirements. Thus, by varying a fuel delivery split between a direct injection location and a port injection location the present disclosure enables limiting an amount of gaseous fuel that blows by a piston under certain conditions. By adjusting swirl controller 74 the present disclosure can vary a swirl ratio and thus limit mixing of gaseous fuel with air to similar effect. Directionally, greater swirl will tend to be associated with greater mixing and lesser swirl associated with lesser mixing. Thus, varying a position of swirl controller 74 can vary in situ mixing of gaseous fuel with air in the cylinder. In further examples a fuel delivery timing can be varied as noted above. In some instances, retarding of a fuel delivery timing can result in injected gaseous fuel having less time to mix with air in or just prior to entering the cylinder and tendency toward less dispersion. Put differently, by injecting gaseous fuel relatively later in an engine cycle, less mixing and less blowby of gaseous fuel into the crankcase may occur. Injecting timing could also be advanced to facilitate greater mixing where blowby is of less concern.

To perform the various monitoring and executive actions relating to limiting crankcase fuel accumulation, engine system 10 includes a control system 60. Control system 60 includes a fueling control unit 62 in control communication with each of first gaseous fuel admission valve 38 and second gaseous fuel admission valve 40, as well as third gaseous fuel admission valve 46. Fueling control unit 62 may include a processor 64 and a computer readable memory 66. Processor 64 may include any suitable microprocessor or microcontroller, for example. Computer readable memory 66 may include RAM, ROM, SDRAM, EEPROM, a hard drive, FLASH, or still another suitable volatile or non-volatile memory.

Fueling control unit 62 is structured to monitor at least one engine system parameter upon the basis of which a blowby amount of gaseous fuel from cylinder 16 to crankcase 18 varies as noted above. It has been observed that a relative blowby amount scales generally with engine load. At higher engine loads blowby tends to be greater, and at lower engine loads blowby tends to be less. Control system 60 may also include an engine sensor 70 such as an engine speed sensor. Those skilled in the art will appreciate various strategies for estimating or inferring engine load based in part upon engine speed, fueling, mass air flow, and potentially still other parameters. Accordingly, one engine system parameter upon the basis of which a blowby amount of gaseous fuel varies is engine load. Monitoring at least one engine system parameter includes monitoring an engine load parameter in some embodiments.

Other engine operating parameters upon the basis of which a blowby amount of gaseous fuel varies may also be monitored, and in particular upon the basis of which a blowby amount of gaseous hydrogen fuel varies. In one example, a monitored engine system operating parameter can include an H2 concentration or a relative amount of H2 versus HC which is combusted in the cylinder. In other words, a fuel mixture relatively richer in H2 versus HC, or more generally a fuel or fuel mixture having a higher H2 concentration, can be expected to result in more blowby of H2 into crankcase 18. Still other engine system operating parameters that are monitored may not be directly related to a blowby amount but nevertheless relate to accumulation of H2 in crankcase 18. For example, control system 60 can monitor an amount of H2 accumulated in crankcase 18 (a "gaseous fuel accumulation parameter") directly employing a fuel accumulation crankcase sensor 72 structured to monitor gaseous fuel accumulation in crankcase 18. Crankcase sensor 72 may be exposed to a fluid volume of crankcase 18 and produces data indicative of a current gaseous fuel concentration in crankcase 18, and in particular an H2 concentration in some embodiments. An engine system operating parameter that is monitored may also include at least one gaseous fuel availability parameter, including, for example, an H2 availability parameter. To this end, control system 60 may also monitor an H2 level in tank 42 employing H2 tank level sensor 68.

Figure 2:
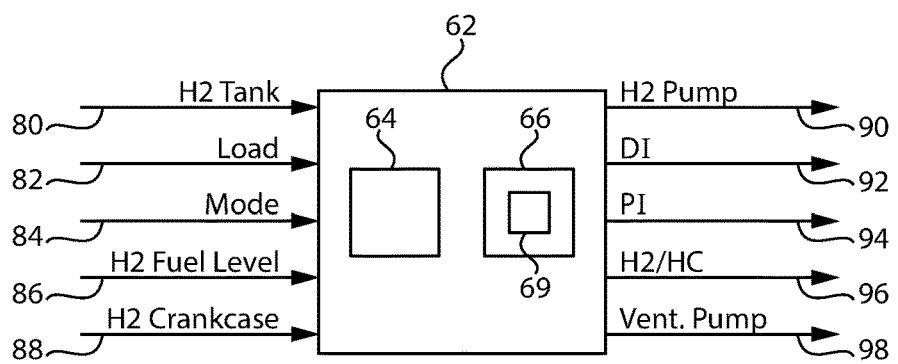
FIG. 2 is a block diagram of a fueling control unit, according to one embodiment.

Focusing now on FIG. 2, fueling control unit 62 may further include a crankcase fuel accumulation model 69 stored on computer readable memory 66 that is populated based upon the several monitored engine system parameters and serves as the basis for outputting various control commands. As shown in FIG. 2, fueling control unit 62 can receive an H2 tank level input 80 such as from sensor 68, an engine load input 82, and an operating mode input 84 indicative of relative proportions of fuel injected at the first fuel delivery location and the second fuel delivery location. H2 tank level input 80 may indicate how much H2 is available, potentially causing less H2 to be delivered (and more HC) where supplies are low and/or more H2 to be delivered (and less HC) where supplies are high, balanced with other factors considered in the crankcase fuel accumulation model. Fueling control unit 62 may also receive an H2 fuel level input 86, indicative of a desired relative amount of H2 delivered to engine system 10, and an H2 crankcase gaseous fuel accumulation input 88. Based upon the several inputs, fueling control unit 62 can produce an H2 pump command 90, fueling control commands including a direct injection or DI command 92, a port injection or PI command 94, an H2/HC fueling command 96 for operating third fuel admission valve 46, and a ventilation pump command 98.

As noted above, one monitored engine system parameter upon the basis of which gaseous fuel accumulation in crankcase 18 varies can include an engine load parameter. Fueling control unit 62 may be further structured to vary operation of crankcase ventilation blower 56 based on the monitored engine load parameter. It will also be recalled that blowby generally scales with engine load. Accordingly, at higher engine loads a blowby amount of gaseous fuel may be relatively greater, and ventilation blower 56 can be operated to pump air from ambient into crankcase 18 to purge crankcase 18 and thereby mitigate the gaseous fuel accumulation. At lower engine loads it may be possible and desirable to maintain crankcase accumulation of the gaseous fuel below a flammability limit solely by controlling delivery location, delivery timing, or in situ mixing, making operation of ventilation blower 56 unnecessary. Since a blowby amount of H2 can also vary on the basis of other parameters, including H2 concentration, it will be appreciated that there are combinations of engine load and other factors where ventilation blower is desirably used as well as combinations of engine load and other factors where ventilation blower 56 does not need to be used. Thus, at least some of the time energy required to operate ventilation blower can be conserved by turning ventilation blower 56 off.

INDUSTRIAL APPLICABILITY

Figure 3:
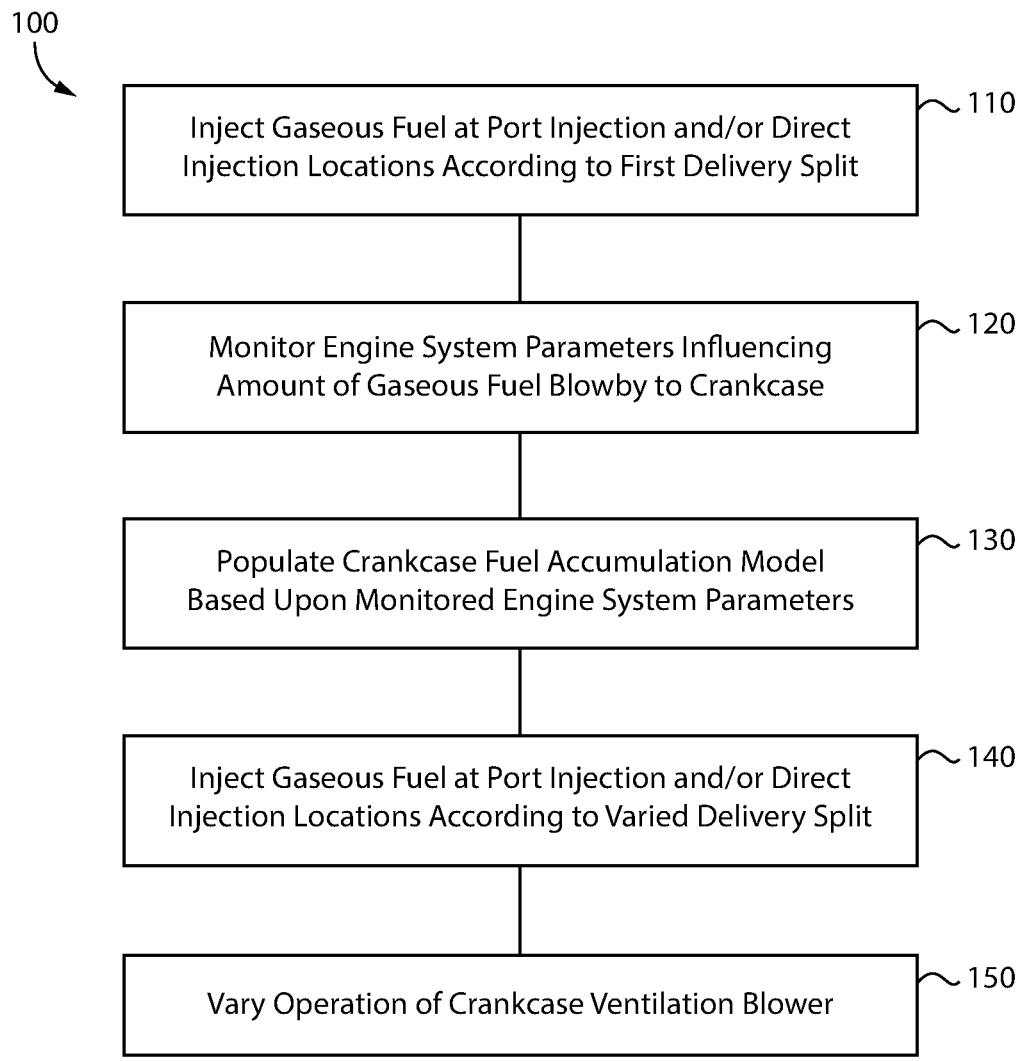
FIG. 3 is a flowchart illustrating example methodology and logic flow, according to one embodiment.

Referring now also to FIG. 3, there is shown a flowchart 100 illustrating example methodology and logic flow, according to one embodiment. At a block 110 gaseous fuel is conveyed into a cylinder for combustion and may be injected at the port injection and/or direct injection locations according to a first fuel delivery split. Gaseous fuel may also be delivered at the fumigation delivery location. The fuel delivery split could include 50% fuel delivery at each location, a majority of fuel delivery at one location versus a minority at another location, or an entirety of fuel delivery at only one of the two locations. From block 110 flowchart 100 advances to a block 120 to monitor one or more engine system parameters influencing an amount of gaseous fuel blowby to the crankcase.

As discussed herein, various monitored engine system parameters may affect a blowby amount of gaseous fuel, including H2 and potentially also HC, to crankcase 18. Other engine system parameters, including gaseous fuel availability such as H2 tank level or even line gas availability, and actual gaseous fuel crankcase accumulation, can also be monitored. Such factors do not directly influence blowby tendency, but can bear on whether blowby can be tolerated, in the case of the actual crankcase accumulation, or whether H2 delivery should be varied in view of H2 availability for injection. From block 120 flowchart advances to a block 130 to populate the crankcase fuel accumulation model based upon the various monitored engine system parameters.

From block 130 fueling control unit 62 can determine fueling control commands, such as electrical current control commands, based upon the crankcase fuel accumulation model, and at a block 140 output the fueling control commands to inject gaseous fuel at the port injection and/or direct injection locations according to a varied fuel delivery split. In other instances, rather than varying delivery split, in situ mixing, or delivery timing could additionally or alternatively be varied. From block 140 flowchart 100 may advance to a block 150 to vary operation of crankcase ventilation blower to turn on blower 56, turn off blower 56, or adjust blower speed, for example.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine system comprising:
   monitoring at least one engine system parameter upon the basis of which a blowby amount of a gaseous fuel to a crankcase in a gaseous fuel engine varies;
   conveying the gaseous fuel into a cylinder in the gaseous fuel engine for combustion;
   controlling at least one of a delivery location, a delivery timing, or in situ mixing of the gaseous fuel with air, based on the monitored at least one engine system parameter; and
   limiting the blowby amount of the gaseous fuel that blows by a piston in the gaseous fuel engine based on the controlling at least one of a delivery location, a delivery timing, or in situ mixing of the gaseous fuel with air, such that crankcase accumulation of the gaseous fuel is maintained below a flammability limit.

2. The method of claim 1 wherein the gaseous fuel includes gaseous hydrogen fuel (H2).

3. The method of claim 2 wherein the H2 is combusted in the cylinder with a gaseous hydrocarbon fuel (HC).

4. The method of claim 2 wherein the controlling at least one of a delivery location, a delivery timing, or in situ mixing includes controlling a delivery split between a first delivery location and a second delivery location.

5. The method of claim 4 wherein the first delivery location includes a direct injection location and the second location includes a port injection location or a fumigation delivery location.

6. The method of claim 5 further comprising limiting dispersion of the gaseous fuel in the cylinder based on the controlling at least one of a delivery location, a delivery timing, or in situ mixing.

7. The method of claim 2 wherein the monitoring at least one engine system parameter includes monitoring an engine load parameter.

8. The method of claim 7 wherein the controlling at least one of a delivery location, a delivery timing, or in situ mixing is based on a crankcase fuel accumulation model.

9. The method of claim 8 further comprising populating the crankcase fuel accumulation model based on the engine load parameter and a monitored fuel accumulation parameter.

10. The method of claim 9 further comprising populating the crankcase fuel accumulation model with a gaseous fuel availability parameter.

11. A gaseous fuel engine system comprising:
    a gaseous fuel engine having a cylinder formed therein, and a crankcase in blowby communication with the cylinder;
    a fuel system including a first gaseous fuel admission valve at a first fuel delivery location relative to the cylinder and a second gaseous fuel admission valve at a second fuel delivery location relative to the cylinder;
    a fueling control unit in control communication with each of the first gaseous fuel admission valve and the second gaseous fuel admission valve and structured to:
    monitor at least one engine system parameter upon the basis of which a blowby amount of a gaseous fuel from the cylinder to the crankcase varies; and
    vary at least one of a fuel delivery split between the first fuel delivery location and the second fuel delivery location, a fuel delivery timing, or in situ mixing of the gaseous fuel with air in the cylinder, based on the monitored at least one engine system parameter, such that the blowby amount of the gaseous fuel that blows by a piston in the cylinder is limited to maintain crankcase accumulation of the gaseous fuel below a flammability limit.

12. The engine system of claim 11 wherein the first fuel admission valve includes a direct injection fuel admission valve, and the second fuel admission valve includes a port injection fuel admission valve.

13. The engine system of claim 12 further comprising a crankcase ventilation blower, and wherein:
    the monitored engine system parameter includes an engine load parameter; and
    the fueling control unit is further structured to vary operation of the crankcase ventilation blower based on the engine load parameter.

14. The engine system of claim 12 further comprising a computer readable memory storing a crankcase fuel accumulation model populated with an engine load parameter and a gaseous fuel availability parameter.

15. The engine system of claim 14 further comprising a gaseous fuel sensor structured to monitor gaseous fuel accumulation in the crankcase, and the crankcase fuel accumulation model is populated based on the gaseous fuel accumulation in the crankcase.

16. The engine system of claim 14 wherein the gaseous fuel availability parameter includes a gaseous hydrogen fuel (H2) availability parameter.

17. A fuel system for a gaseous fuel engine system comprising:

a fueling control unit structured to:
monitor at least one engine system parameter upon the basis of which a blowby amount of a gaseous fuel from a cylinder to a crankcase in a gaseous fuel engine varies;
control, via fueling control commands to at least one of a first fuel admission valve at a first fuel delivery location relative to the cylinder and a second fuel admission valve at a second fuel delivery location relative to the cylinder, at least one of a delivery location or a delivery timing of gaseous fuel to the cylinder, based on the monitored at least one engine system parameter; and
limit the blowby amount of the gaseous fuel that blows by a piston in the cylinder based on the controlling at least one of a delivery location or a delivery timing of the gaseous fuel so as to limit crankcase accumulation of the gaseous fuel.

18. The fuel system of claim 17 further comprising a gaseous fuel sensor structured to monitor gaseous fuel accumulation in the crankcase.

19. The fuel system of claim 17 further comprising a computer readable memory storing a crankcase fuel accumulation model populated with an engine load parameter and a crankcase fuel accumulation parameter, and the fueling control unit is further structured to produce the fueling control commands based on the crankcase fuel accumulation model.

20. The fuel system of claim 18 wherein the fueling control unit is further structured to vary operation of a crankcase ventilation blower based on the engine load parameter.

* * * * *